Sept. 10, 1963 W. H. HOUSE, JR 3,103,093
ROTARY CUTTING BLADE
Filed Dec. 15, 1961
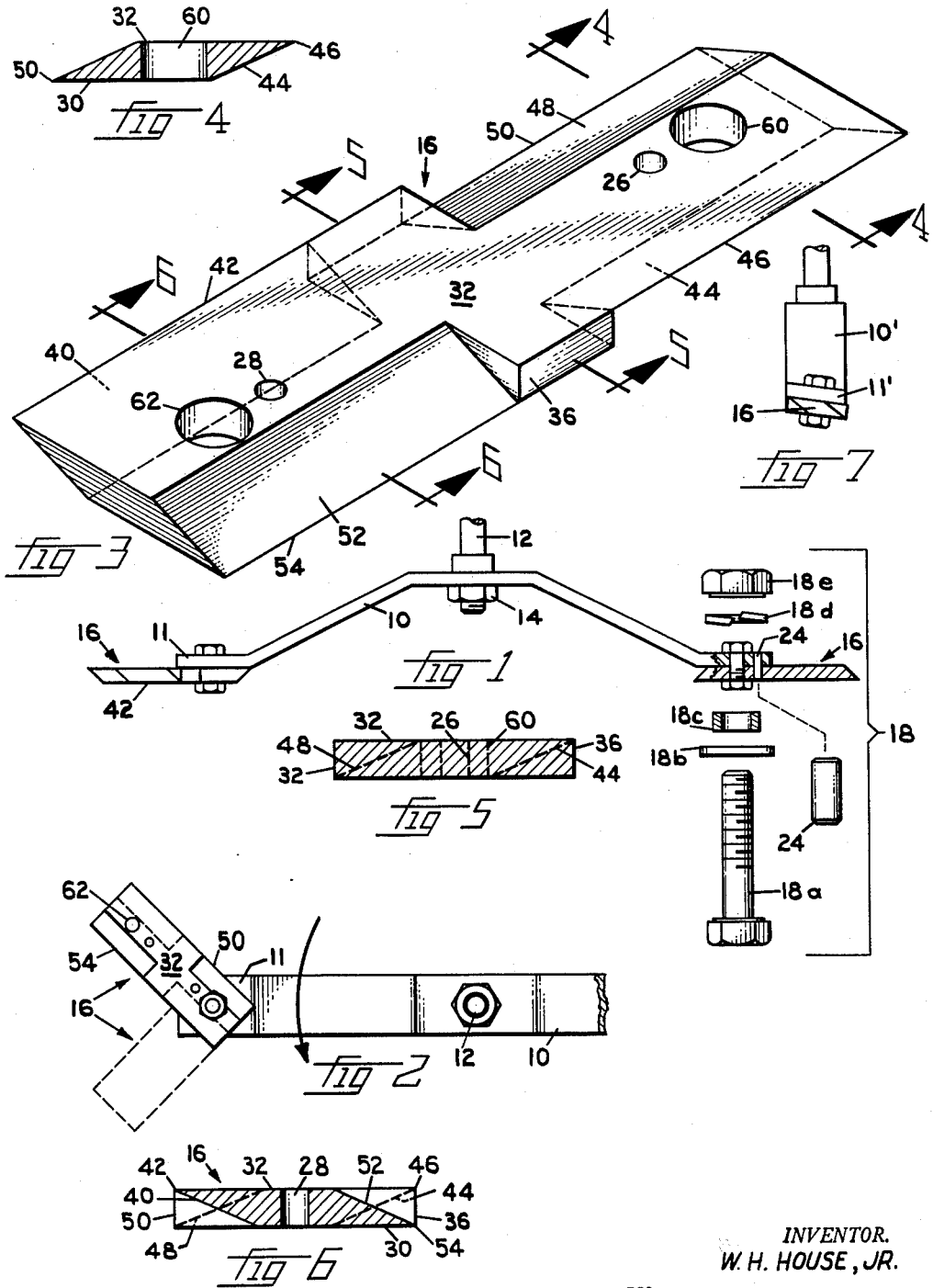
INVENTOR.
W. H. HOUSE, JR.
BY
Head & Johnson
ATTORNEYS United States Patent Office 3,103,093
Patented Sept. 10, 1963

3,103,093
ROTARY CUTTING BLADE
William H. House, Jr., 6749 E. 27th Place,
Tulsa, Okla.
Filed Dec. 15, 1961, Ser. No. 159,687
5 Claims. (Cl. 56—295)

This invention relates to a rotary power mower blade. More particularly, it concerns an articulated power mower blade construction useful with industrial type cutting machines.

Briefly, this invention relates to a rectangular type rotary power mower blade wherein the blade portion is pivotably attached at each end of a centrally rigid member connected to suitable power source. The blade is designed with bevelled cutting edges along both sides of each end, such that when one edge becomes worn the blade is removed, rotated or turned over, which in any case exposes a fresh cutting edge. Each edge will extend in the same relative direction when in cutting position. This provides four separate cutting edges for each blade.

Industrial type rotary cutting units are of multiple use for mowing, clipping, and shredding grass, weeds and in many instances light brush. Such units are useful on highways, railroads and utility right of ways, park areas, estates and golf course "roughs." Such industrial type units are, in many instances, either of the under chassis type or interconnected with a separate power take-off from a pulling tractor. Typically, the operator of heavy duty and industrial type mowing equipment is removed from facilities having new blades or for sharpening cutter blades in the event same becomes necessary during use.

Accordingly, it becomes a primary object of this invention to provide a rotary cutting blade which may be readily removed by the operator, reversed, or turned over to provide a new sharper cutting edge.

It is further object of this invention to provide a swivel type cutting blade for use with rotary power mowers.

It is still a further object of this invention to provide a cutting blade for rotary power mowers which is economical, of high strength, and readily usable by operators.

A further object of this invention is to provide an intermediate blade holding portion for use with the blade of this invention which establishes a cutting angle of attack for improved mowing.

Further objects of this invention will become more apparent upon further reading of the descriptive and operative portion of the specification and claims taken in conjunction with the illustrations of which:

FIGURE 1 is a side elevational view with parts broken away and parts shown in section of the rotary power mower blade construction according to this invention.

FIGURE 2 is a bottom fragmentary elevational view thereof.

FIGURE 3 is an enlarged perspective view of the blade for use according to this invention.

FIGURES 4, 5 and 6 are sectional views taken along the lines 4—4, 5—5 and 6—6 of FIGURE 3.

FIGURE 7 is a side view of an alternate embodiment according to this invention.

Description

Referring now to the drawings in greater detail, intermediate rotor member 10 is rigidly fixed to a vertical power shaft 12, using locking nut 14. Rotative power is derived from a separate source, not shown. The rotor in this embodiment is angularly disposed downward from an upper housing, not shown, with blade attachment and support extensions 11 at each end operative in a horizontal plane.

The cutting blade of this invention, designated generally by the numeral 16, is attached to the lower side of the extensions 11 of the intermediate member 10, using a bolt 18a, flat washer 18b, spacer bushing 18c, lock washer 18d, and nut 18e, shown by assembly bracket 18. Spacer bushing 18c is of outside diameter approximately that of the opening 20 or 22 in blade 16 to provide a rotatable fit. The width of the bushing is slightly greater than the width of blade 16 to permit swivel action of blade 16 about the tightened bolt assembly in those instances when the cutting edge strikes an obstruction. The blade is normally retained fixed, in one embodiment, using a shear pin 24 extending from extension 11 through the blade 16. Openings 26 and 28 are provided in the blade for pin 24. Upon shearing of pin 24, the cutting blade swings back, as shown in the dotted line of FIGURE 2, preventing damage to the cutter and other associated equipment.

In units without the shear pin the pivotal action permits incremental "hacking" of light brush during operation. The bolt assembly 18 is of further nature that the blade may be readily removed, rotated or turned to expose a new cutting edge position.

Referring now to FIGURES 3, 4, 5 and 6, cutting blade 16 will be described with reference to its position shown. The blade is formed of a substantially rectangular rigid steel member defining a bottom surface 30, top surface 32, left side 34 and right side 36.

Beveled surface 40 is formed angularly upward from bottom surface 30 toward side 34 to form first cutting edge 42 with top surface 32. Likewise beveled surface 44, in the corner diagonally opposite beveled surface 40, is formed angularly upward from bottom surface 30 toward side 36 to form a second cutting edge 46.

Beveled surface 48 is formed angularly downward from top surface 32 toward side 34 to form third cutting edge 50 with bottom surface 30. Similarly, beveled surface 52, in the corner diagonally opposite beveled surface 48, is formed angularly downward from top surface 32 toward side 36 to form the fourth cutting edge 54. Attachment openings 60 and 62 provide the means whereby the cutting blade 16 may be reversed or turned over to expose a fresh cutting edge. This is accomplished by removing bolt assembly 18, blade 16, and attaching the apparatus at the other opening or turn the blade 16 over and use the original opening to expose the new blade edge.

Referring to the embodiment of FIGURE 7, intermediate member 10' includes blade support extension 11' angularly disposed to provide a greater angle of attack for attached blade 16. This improves the angular cutting position and further increases the lifting ability, i.e., raises the material to be cut into the rotating blade path.

As a typical example, blades 16 of this invention are of a high strength steel such as 5150 or 4130 steel, machined from a rectangular block approximately ⅜″ thick and thereafter hardened by heat-treatment. The beveled portions 22, 24, 26 and 28 are cut at an angle of about 22° to 25° from horizontal.

Although the invention has been described with reference to specific and preferred embodiments it will be apparent, however, that many modifications can be made without departing from the spirit of the invention.

Accordingly, this invention should be construed not to be limited to the embodiment herein described, but should be limited only by the scope of the appended claims.

The normal cutting position of the blade is such that downwardly beveled face be exposed toward the direction of rotation. For example, in the position of FIGURE 2 edge 54 is exposed to cut. Removal of the shear pin and assembly 18 and merely turning the blade over, and using the same attachment opening, now exposes edge 42 to cut. The same procedure applies to the other edges, thus providing four separate cutting edges.

What is claimed is:

1. A cutting blade for a rotary type mower comprising, an elongated body having a single attachment opening adjacent each end, and cutting edges along both sides of each end portion thereof, said edges being formed by bevelled surfaces, each of said surfaces extending in the same relative direction when exposed to its rotary cutting orbit.

2. A cutting blade of the type defined in claim 1 wherein said cutting edges along both sides of each end portion define four separate edges.

3. A cutting blade of the type defined in claim 1 wherein said body includes a shear pin opening adjacent said attachment opening.

4. A cutting blade of the type defined in claim 1 wherein said bevelled surfaces along both sides of each end portion are substantially parallel to each other.

5. A cutting blade of the type defined in claim 4 wherein said bevelled surfaces along both sides of one end portion are substantially parallel to each other in one angular direction and said bevelled surfaces along both sides of the other end portion are substantially parallel to each other in an opposite angular direction.

References Cited in the file of this patent

UNITED STATES PATENTS

| | | |
|---|---|---|
| 2,592,755 | Soenksen | Apr. 15, 1952 |
| 2,715,307 | Carter | Aug. 16, 1955 |
| 2,786,322 | McEvers | Mar. 26, 1957 |
| 2,924,058 | Brooks | Feb. 9, 1960 |
| 2,963,844 | Engler | Dec. 13, 1960 |